United States Patent
Hershey et al.

(10) Patent No.: US 6,643,608 B1
(45) Date of Patent: Nov. 4, 2003

(54) SYSTEM AND METHOD FOR COLLECTING AND ANALYZING SHIPMENT PARAMETER DATA AFFECTING PREDICTED STATISTICAL VARIABLES OF SHIPPED ARTICLES

(75) Inventors: John E. Hershey, Ballston Lake, NY (US); Brock E. Osborn, Niskayuna, NY (US); Scott C. Evans, Burnt Hills, NY (US); Kenneth B. Welles, II, Scotia, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/510,321

(22) Filed: Feb. 22, 2000

(51) Int. Cl.$^7$ ............................................... G06F 17/18
(52) U.S. Cl. ........................... 702/181; 702/34; 702/56; 702/140; 340/673; 324/207.22; 324/207.23; 324/604; 324/607; 700/13; 700/19; 700/51; 700/73
(58) Field of Search ............................... 702/33–36, 56, 702/98, 99, 113, 127, 130, 132, 136, 138, 140, 141, 150, 152, 179, 184, 187, 188, FOR 123, 126, 134, 135, 139, 144, 170, 151, 171; 700/2, 5, 7, 13, 15, 17, 19, 51, 52, 54, 57, 80, 83, 91, 112–113, 115, 117, 213, 214; 340/500, 501, 673; 324/207.22, 207.23, 209, 454, 460, 601, 604, 607, 609

(56) References Cited

U.S. PATENT DOCUMENTS

| | | |
|---|---|---|
| 4,177,751 A | 12/1979 | Rubey |
| 4,219,708 A | 8/1980 | Rubey |
| 4,239,014 A | 12/1980 | Rubey |
| 4,745,564 A * | 5/1988 | Tennes et al. ............... 364/566 |
| 4,862,394 A | 8/1989 | Thompson et al. |
| 4,982,684 A | 1/1991 | Rubey |
| 5,323,729 A | 6/1994 | Rubey |
| 5,528,228 A | 6/1996 | Wilk |
| 5,755,175 A | 5/1998 | White et al. |
| 5,769,598 A | 6/1998 | MacNeil |
| 2001/0001135 A1 * | 5/2001 | Aronson ....................... 702/34 |

* cited by examiner

*Primary Examiner*—Marc S. Hoff
*Assistant Examiner*—Elias Desta
(74) *Attorney, Agent, or Firm*—David C. Goldman, Esq.; Beusse Brownlee, Bowdoin & Wolter, PA; Enrique J. Mora

(57) ABSTRACT

A system for collecting and analyzing shipment parameter data, e.g., temperature, vibration, acceleration, shock, humidity, barometric pressure, pH, transit time, container position, etc., affecting predicted statistical variables of articles is provided. Examples of the predicted statistical variables may include article life expectancy, warranty costs, service and/or maintenance schedules, etc. The system is made up of a plurality of data collection subsystems for respectively collecting shipment parameter data encountered by respective articles being shipped, and a data analysis subsystem coupled to receive the collected shipment data for adjusting the respective predicted statistical variables of the articles.

27 Claims, 2 Drawing Sheets

SYSTEM AND METHOD FOR COLLECTING AND ANALYZING SHIPMENT PARAMETER DATA AFFECTING PREDICTED STATISTICAL VARIABLES OF SHIPPED ARTICLES

BACKGROUND OF THE INVENTION

The present invention is generally related to remote data collection and predictive analysis, and, more particularly, is related to a system and method for collecting and analyzing shipment parameter data affecting predicted statistical variables of articles being shipped in commerce.

As will be appreciated by those skilled in the art, it is desirable to be able to accurately predict statistical variables of articles that may be affected by environmental factors as the articles are being shipped from an originating point of shipment to a destination point, which may or may not be the final destination point of the article. Examples of such statistical variables may include article life expectancy, warranty costs, service and/or maintenance schedules, etc. For example, if it was feasible to reliably and accurately determine when a relatively expensive and delicate article, such as an X-ray tube, would fail, then one could arrange for just-in-time replacement of the article before the failure actually occurs. If one were to wait until the failure occurs, then there would be a downtime loss of service and a concomitant loss of revenue. Conversely, if one were to arbitrarily start a replacement of the article well in advance before the failure occurs, then there would be a monetary loss incurred by any resulting unused inventory. Thus, it would be desirable to provide a system and method that would allow for more accurately estimating the predicted statistical variables of the articles based on shipment parameter data indicative of various environmental factors to which the articles may have been subjected to during shipment.

It has been recently observed that various environmental parameters, e.g., ambient temperature, humidity, vibration, and other factors may have significant effects on the lifetime of key components of various electromechanical systems. In one exemplary case dealing with automobile dealer warranties, it was found that the Interior Climate and Control (ICC) system of an automobile was particularly sensitive to temperature extremes. It will be appreciated that the ICC system includes various electromechanical components, such as compressor, mounting bracket, clutch and pulley, orifice tube, condenser, heater core, heater control valve, receiver/dryer, evaporator, air ducts and outlets, accumulator, air conditioner temperature control program, seals and gaskets, etc. The dependence in this case was so marked that it was possible to create a substantially accurate state-by-state model for such dependence. FIG. 1 illustrates respective exemplary distribution graphs that represent ICC claims experienced in the state of Arizona as a function of month, which is in turn directly related to a function of peak ambient temperatures. As shown in FIG. 1, the distribution drawn in a solid line represents an empirically-derived distribution, and the distribution drawn in a dotted-line represents a distribution generated from a model that correlates peak temperatures versus ICC claims.

Thus, it is believed that environmental effects that occur during the shipment, e.g., transportation and/or storage of sensitive components, such as electromechanical parts, electronic tubes, integrated circuits, chemical materials, etc., may have significant impact on various predictive statistical variables of the articles being shipped. It is further believed that, if the appropriate shipment parameter data are collected and analyzed, a system and method may now be provided so as to reduce the variance of the predictive statistical variables of the respective articles, such as the estimated article lifetime, warranty costs, maintenance and/or servicing schedules, etc. It is desirable that such system and method allow for adjusting the predicted statistical variables of the respective articles based on the historical shipment data of such articles. It will be appreciated that such system and method would allow for substantially mitigating the above-discussed inventory and downtime losses.

BRIEF SUMMARY OF THE INVENTION

Generally speaking, the present invention fulfills the foregoing needs by providing a system for collecting and analyzing shipment parameter data, e.g., temperature, vibration, acceleration, shock, humidity, barometric pressure, pH, transit time, container position, etc., affecting predicted statistical variables of articles. Examples of the predicted statistical variables may include article life expectancy, warranty costs, service and/or maintenance schedules, etc. The system comprises a plurality of data collection subsystems for respectively collecting shipment parameter data encountered by respective articles being shipped, and a data analysis subsystem coupled to receive the collected shipment data for adjusting the respective predicted statistical variables of the articles.

The present invention further fulfills the foregoing needs by providing a method for collecting and analyzing shipment parameter data affecting predicted statistical variables of articles. The method allows for collecting shipment parameter data encountered by articles being shipped using a plurality of respective data collection subsystems. The method further allows for adjusting the respective predicted statistical variables of the articles using a data analysis subsystem coupled to receive the collected shipment data.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

Figure 2:
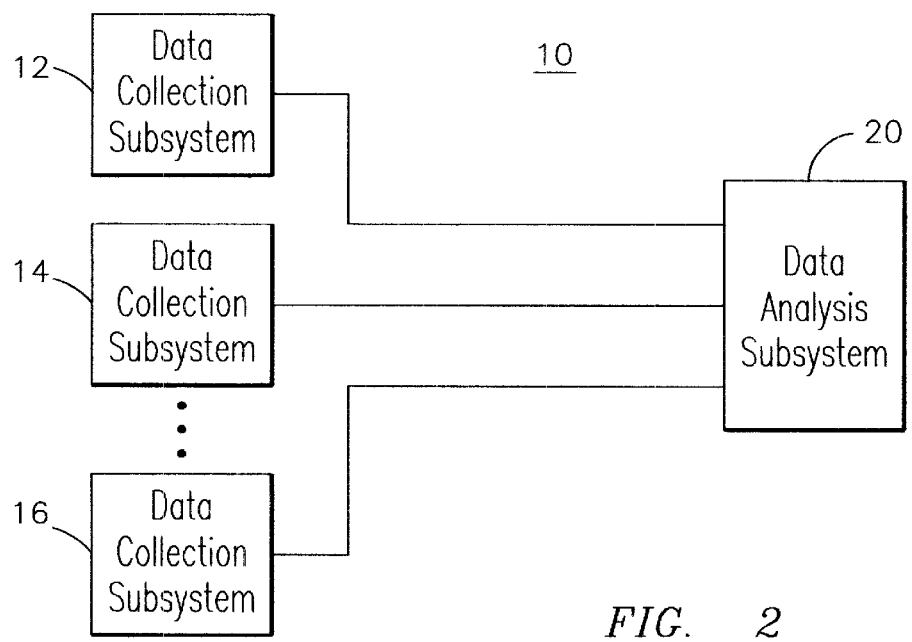
FIG. 2 is a block diagram schematic of the system of the present invention including a plurality of data collection subsystems and a data analysis subsystem.

FIG. 2 shows an exemplary block diagram schematic of a system 10 for collecting and analyzing shipment parameter data affecting predicted statistical variables of articles, such as article life expectancy, maintenance schedules, warranty costs, etc. As shown in FIG. 2, system 10 comprises a plurality of data collection subsystems, e.g., 12, 14, 16, for respectively collecting shipment parameter data indicative of environmental and other factors encountered by respective articles being shipped. Data analysis subsystem 20 is coupled to receive the collective shipment data from the plurality of data collection subsystem 12, 14, 16 for adjusting the respective predictive statistical variables of the articles. It will be appreciated that the data analysis subsystem and the plurality of data collection subsystems in one embodiment may be generally remote from one another and thus, to implement data transfers from the respective data Collections subsystems to the data analysis subsystem any suitable communications network may be used using well-understood communications techniques. Examples of communications networks that can be used may be telephone-based networks, wireless data carrier services, private intranets, or the internet.

It should be appreciated however, that the data analysis subsystem need not be limited to a remotely situated data analysis subsystem since each respective data collection subsystem could be equipped with an onboard data analysis subsystem to perform local data analysis. Thus, in another embodiment, the date transfer from each respective data collection subsystem could comprise raw sensor data and/or onboard processed or analyzed sensor data. In either case, any of the above referenced communication techniques could be employed to transfer raw and/or analyzed sensor data to, for example, a designated service center, archival center, etc.

Figure 3:
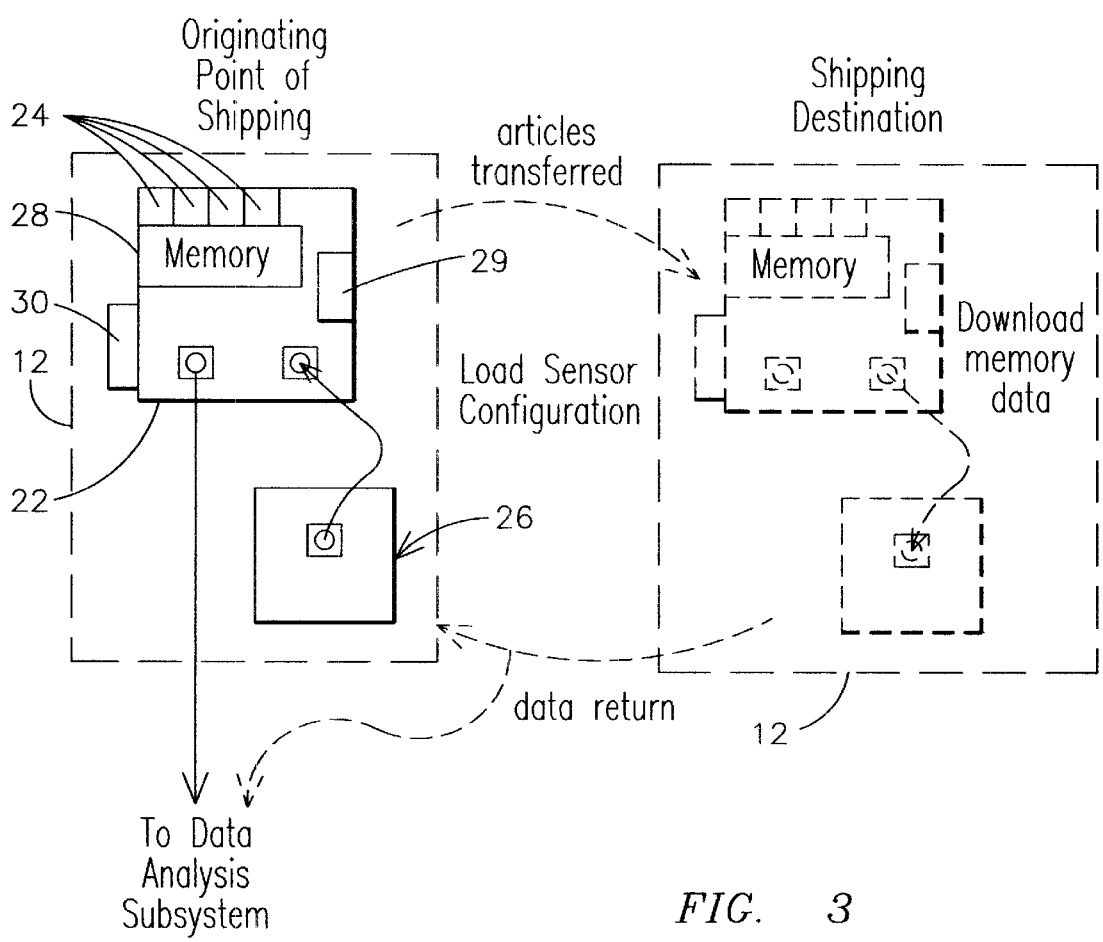
FIG. 3 is a block diagram schematic illustrating one exemplary embodiment of one of the data collection subsystems shown in FIG. 2.

As illustrated in FIG. 3, each data collection subsystem, e.g., subsystem 12, comprises a container 22 for storing one or more of the articles to be shipped. A plurality of respective sensors 24 is provided in the container for collecting the shipment parameter data relevant to the articles in the container. By way of example and not of limitation, sensors that may be used for sensing the shipment parameter data may include sensors for respectively sensing temperature, vibration, acceleration, shock, humidity, barometric pressure, presence of deleterious chemical agents, such as may be sensed with a pH sensor, transit time, such as may be sensed with a timer, and container position, e.g., container geographical position, such as may be sensed with a Global Positioning System, and/or container relative position to a predetermined reference axis, such as may sensed with an accelerometer or level sensor. It will be appreciated by those skilled in the art that any of the above-described sensors may comprise off-the-shelf sensors, that is, commercially available sensors.

A sensor controller 26 may be programmed to select a respective sensor configuration, such as may be based on the type of articles being shipped. For example, controller 26 may be used to load the sensor configuration into the data collection subsystem 12 at the originating point of shipping. The sensor configuration may allow for selecting which respective sensors are to be active during a respective shipment, and may further allow for selecting the sampling rates for the selected sensors when active. The respective sensor configuration-may also allow for selecting time intervals during which respective sensor outputs are recorded or stored in a memory 28. For example, this feature would allow for reducing demand of electrical energy from an energy storage device 29, e.g., a battery, that powers the sensors and the controller 26, and would further allow for reducing data storage and data processing requirements since the sensor data may not have to be recorded continuously. Controller 26 may further allow for selecting scaling factors, such as sensor gains, etc. For example, if the container is expected to be transported in geographical areas known to have wide temperature changes, then the scale factor for the temperature sensor may be selected to accommodate such wide temperature changes. Conversely, if the container is expected to be transported in geographical areas known to have narrow temperature changes, then the scale factor for that sensor may be selected to handle narrow temperature changes. Controller 26 may be further programmed to execute sensor self-tests at predetermined times and execute predetermined diagnostic protocols for interpreting and acting on the respective self-test results. Exemplary flow of data and movement of data collection subsystem 12 is illustrated in FIG. 3 from an originating point of shipping (wherein subsystem 12 is drawn in a solid line) to a shipping destination (wherein subsystem 12 is drawn in a dashed-line). By way of example, in FIG. 3, uploading of the sensor configuration and downloading of the shipment parameter is each respectively depicted via an electrical cable connected to input/output ports in the container. As will be appreciated by those skilled in the art, data uploading or downloading from the respective data collection subsystems may be executed by any other data uploading/downloading technique, such as wireless data transfer techniques, optical data transfer techniques using infrared-based devices, magnetic coupling, etc.

Figure 1:
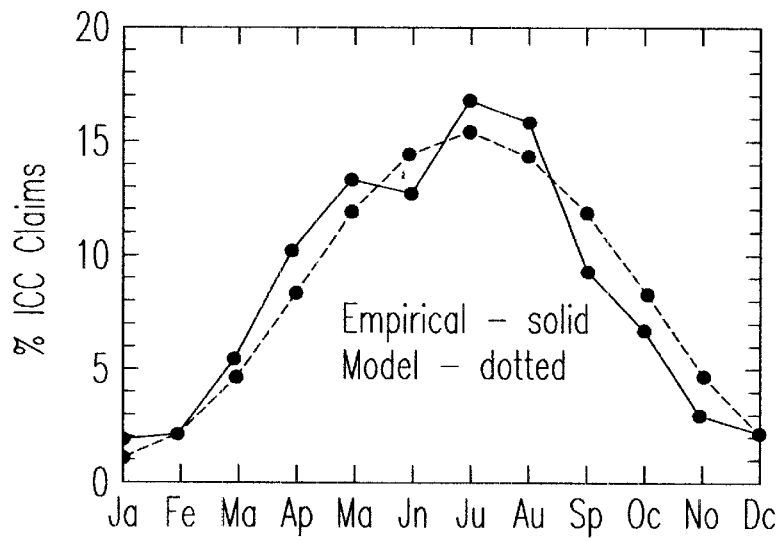
FIG. 1 is an exemplary graph illustrating a dependence relationship between claims related to a given article and temperature, and wherein such exemplary graph is used for facilitating understanding of the system and method of the present invention.
Figure 4:
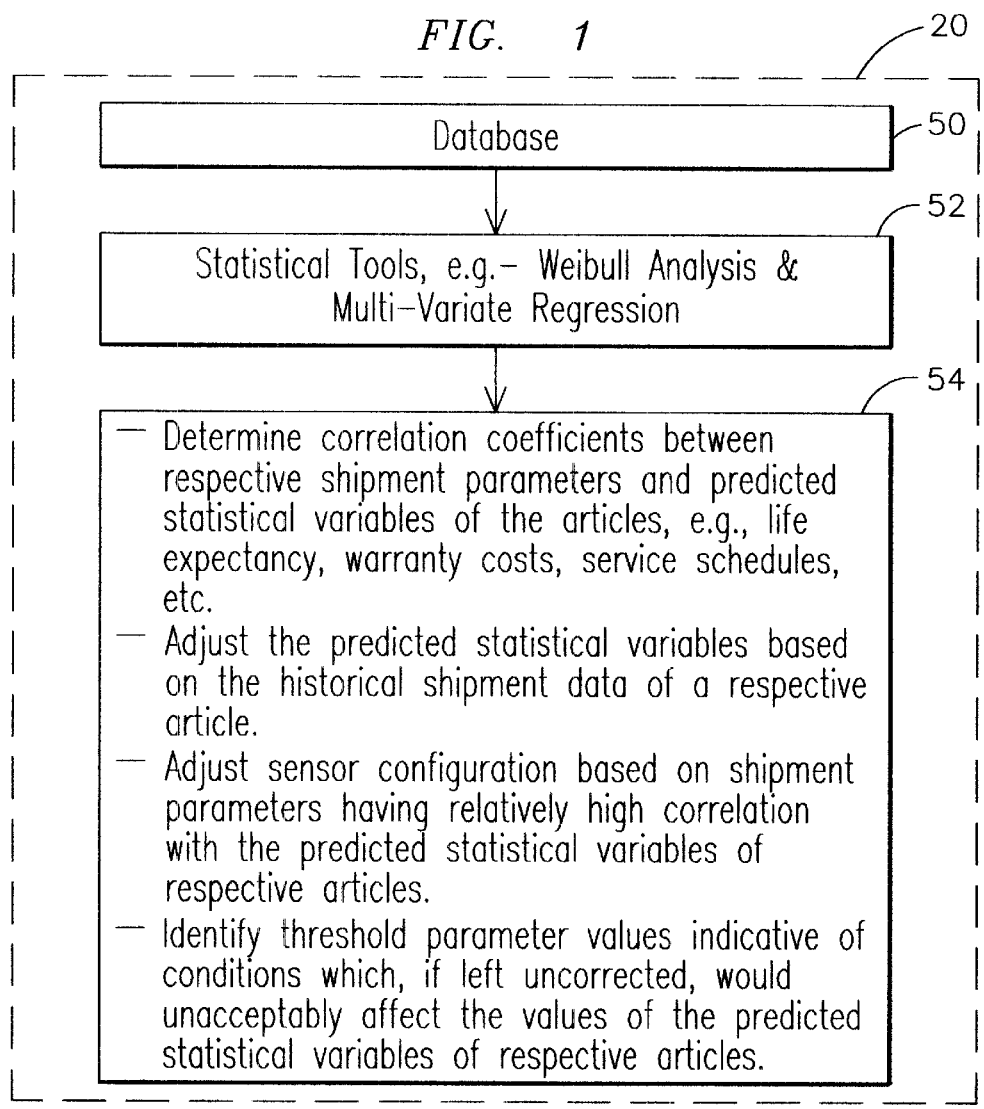
FIG. 4 is a block diagram schematic illustrating one exemplary embodiment of the data analysis subsystem shown in FIG. 2.

As suggested above and illustrated in FIG. 4, data analysis subsystem 20 receives the shipment parameter data downloaded at the various shipping destination sites. As shown in the exemplary data return paths shown in FIG. 3, it will be appreciated that such data may be received directly from a shipping destination site or it could be consolidated at a designated site and then relayed into data analysis subsystem 20. The data analysis subsystem includes a database 50 that contains historical shipment parameter data for each respective one of the shipped articles. Database 50 may further include the predicted statistical variables for each respective article, e.g., article lifetime expectancy, warranty cost, maintenance and/or service schedules, etc. Thus, it will be appreciated that database 50 allows for keeping track of all historical data associated with the lifetime, warranty cost, servicing schedules, etc., of each shipped article. Further database 50 may provide on demand, appropriate linkages between a given article, its shipping history as determined by the data collection subsystem and downloaded into the database 50, and the respective article's predicted lifetime and warranty specifics. The database 50 is also programmed to receive and archive shipment parameter data related to the environmental parameters of interest for a given article, that is, the environmental parameters most likely to influence or affect the predicted lifetime of the article, or other statistical variables associated with the article. As suggested above, examples of such parameters may include, but are not necessarily limited to, temperature and humidity histories over the route of shipment, average temperatures across routes of transit, temperature and humidity histories at cities of shipment origin and destination, intermediate storage sites, etc.

A computational or processing module 54 may be programmed to run a statistical tools module 52 that may contain various sub-modules of applied multi-variable regression analysis algorithms, Classification and Regression Trace (CART), Weibull analysis, and other standard data mining tools and techniques. As will be appreciated by those skilled in the art, although data mining analysis may be done manually by slicing and dicing the data until a pattern becomes discernible, commercially available support software applications that analyze the data automatically to search for patterns and relationships may be employed such as OnLine Analytical Processing (OLAP) support software that allows a user to quickly analyze data via multidimensional views and hierarchies; Decision Support System. (DSS) support software that allows a user to analyze information and predict the impact of decisions before any such decisions are actually made; Executive. Information System (EIS) support software that allows for consolidating and summarizing ongoing activities; and other such commercially available support software.

It will be appreciated that processing module 54 in cooperation with statistical tool module 52 allows for determining respective correlation coefficients between each respective shipment parameter and/or combinations thereof and the predicted statistical variables of respective articles. Establishing or determining such correlation coefficients allows for adjusting the predicted statistical variables of the respective articles based on the shipment history of that article. For example, if the most influential environmental parameters for a given article are contained in the combination of temperature and humidity, then assuming that that article has been exposed during shipment to a combination comprising high levels of both temperature and humidity then this will allow for adjusting the predetermined statistical variables of that article, such as life expectancy, warranty costs, etc. For example, another article of the same type but not exposed to that combination of high levels of temperature and humidity would be probabilistically expected to have a longer life expectancy as compared to the article that was subjected to such combination of environmental parameters. For readers interested in obtaining further background information regarding regression techniques reference is made to textbook titled "Data Reduction and Error Analysis for the Physical Sciences" by Philip R Bevington, published by McGraw-Hill, Inc, which textbook is incorporated herein by reference.

Assuming the same example wherein the combination of temperature and humidity are the key parameters for predicting the lifetime of a given article, then, under this set of assumptions, it would be reasonable to primarily activate only the temperature and humidity sensors and not all of the remaining sensors in the container. This would allow for saving battery power in container 22, as well as saving computational power. Thus, it will be appreciated that computational module 54 would allow for adjusting the sensor configuration loaded into controller 26 (FIG. 3) based on which shipment parameters have been identified to have relatively high correlation values with the predicted statistical variables of respective articles. It will be appreciated that module 54 would further allow for identifying respective threshold shipment parameter values indicative of shipping conditions which, if left uncorrected, would unacceptably affect the values of the predicted statistical variables of respective articles. The threshold values could be stored in memory 28 (FIG. 3) so that upon respective ones of the shipment parameter values having exceeded the identified threshold parameter values, a suitable alarm 30 (FIG. 3) may be activated to indicate to one or more designated individuals responsible for a given shipment that corrective action needs to be taken. The type of alarm could be audible or it could be visual or a combination of the two, so as to be able to quickly identify to the responsible individual the specific corrective action that needs to be taken in connection with a respective shipment. It will be appreciated that the threshold values need not be limited to environmental data since geographical and time-related shipment data could be used to trigger the alarm, such as may occur if the shipment deviates from a predetermined shipment route, or if the transit time exceeds a contractually promised delivery time, etc.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A system for collecting and analyzing shipment parameter data affecting predicted statistical variables of articles, the system comprising:

a plurality of data collection subsystems for respectively collecting shipment parameter data encountered by respective articles being shipped, wherein each respective data collection subsystem comprises:

a container for storing one or more of the articles during shipment;

a plurality of respective sensors in the container for collecting the shipment parameter data corresponding to said one or more of the articles therein; and a sensor controller coupled to select a respective sensor configuration at least based on the type of articles being shipped, and a data analysis subsystem coupled to receive the collected shipment data for adjusting the respective predicted statistical variables of the articles.

2. The system of claim 1 wherein the predicted statistical variables of the articles are selected from the group consisting of life expectancy, maintenance schedules, and warranty costs.

3. The system of claim 1 wherein the data analysis subsystem includes a database containing historical shipment parameter data for each respective one of the shipped articles.

4. The system of claim 1 wherein the shipment parameter data is selected from the group consisting of temperature, vibration, acceleration, shock, humidity, barometric pressure, pH, transit time, and container position.

5. The system of claim 1 further comprising a module for determining respective correlation coefficients between each respective shipment parameter and/or combinations thereof and the predicted statistical variables of respective articles.

6. The system of claim 3 further comprising a module for adjusting the predicted life expectancy of a respective article based on the historical shipment parameter data of that article.

7. The system of claim 3 further comprising a module for adjusting the predicted service and/or maintenance schedules of a respective article based on the historical shipment data of that article.

8. The system of claim 3 further comprising a module for adjusting the warranty costs of a respective article based on the historical shipment data of the article.

9. The system of claim 1 further comprising a module for adjusting the sensor configuration based on shipment parameters having relatively high correlation coefficient values with the predicted statistical variables of respective articles.

10. The system of claim 1 further comprising a module for identifying respective threshold shipment parameter values indicative of shipping conditions which, if left uncorrected, would unacceptably affect the values of the predicted statistical variables of respective articles.

11. The system of claim 7 having means for issuing alert signals upon respective ones of the shipment parameter values exceeding the identified threshold parameter values.

12. The system of claim 1 wherein the data analysis subsystem and the plurality of data collection subsystems are generally remote from one another.

13. The system of claim 1 wherein the data analysis subsystem comprises an onboard data analysis subsystem or a remote data analysis subsystem relative to each respective data collection subsystem, or both.

14. A method for collecting and analyzing shipment parameter data affecting predicted statistical variables of articles, the method comprising:

collecting shipment parameter data encountered by articles being shipped using a plurality of respective data collection subsystems, wherein the data collection step comprises:

providing a container for storing one or more of the articles during shipment;

collecting the shipment parameter data corresponding to said one or more of the articles in the container using a plurality of respective sensors therein; and selecting a respective sensor configuration at least based on the type of articles being shipped; and adjusting the respective predicted statistical variables of the articles using a data analysis subsystem coupled to receive the collected shipment data.

15. The method of claim 14 wherein the predicted statistical variables of the articles are selected from the group consisting of life expectancy, maintenance schedules, and warranty costs.

16. The method of claim 14 further comprising a step of populating a database containing historical shipment parameter data for each respective one of the shipped articles.

17. The method of claim 14 wherein the shipment parameter data is selected from the group consisting of temperature, vibration, acceleration, shock, humidity, barometric pressure, pH, transit time, and container position.

18. The method of claim 14 further comprising determining respective correlation coefficients between each respective shipment parameter and/or combinations thereof and the predicted statistical variables of respective articles.

19. The method of claim 16 further comprising adjusting the predicted life expectancy of a respective article based on the historical shipment parameter data of that article.

20. The method of claim 16 further comprising adjusting the predicted service and/or maintenance schedules of a respective article based on the historical 15 shipment data of that article.

21. The method of claim 16 further comprising adjusting the warranty costs of a respective article based on the historical shipment data of the article.

22. The method of claim 14 further comprising adjusting the sensor configuration based on shipment parameters having relatively high correlation coefficient values with the predicted statistical variables of respective articles.

23. The method of claim 14 further comprising identifying respective threshold shipment parameter values indicative of shipping conditions which, if left uncorrected, would unacceptably affect the values of the predicted statistical variables of respective articles.

24. The method of claim 20 further comprising a step of issuing alert signals upon respective ones of the shipment parameter values exceeding the identified threshold parameter values.

25. The method of claim 14 wherein the adjusting step is remotely executed relative to each respective data collection subsystem.

26. The method of claim 14 wherein the adjusting step is locally and/or remotely executed relative to each respective data collection subsystem.

27. A system for collecting and analyzing shipment parameter data that may influence an article during shipment, the shipment parameter data being associated with and potentially influencing at least one of a set of predicted statistical variables associated with the article, the system comprising:

a plurality of data collection subsystems for collecting the shipment parameter data, the plurality of data collection subsystems comprising a container for storing the article during shipment and at least one sensor with the container for collecting the respective shipment parameter data during shipment of the article;

a sensor controller coupled to select a respective sensor configuration at least based on the type of articles being shipped;

a data analysis subsystem coupled to receive and analyze the collected shipment parameter data; and a processing module for adjusting the respective predicted statistical variables in response to the influence the collected shipment parameter data had on the respective one of the predicted statistical variables thereby providing a more accurate estimation of the respective predicted statistical variables.

* * * * *